United States Patent
Johnson

[19]

[11] Patent Number: 5,911,673
[45] Date of Patent: *Jun. 15, 1999

[54] NARROW ROW CORN HEAD WITH ANGLED GATHERERS

[75] Inventor: Orlin W. Johnson, Geneseo, Ill.

[73] Assignee: Case Corporation, Racine, Wis.

[ * ] Notice: This patent is subject to a terminal disclaimer.

[21] Appl. No.: 08/764,570

[22] Filed: Dec. 13, 1996

[51] Int. Cl.⁶ .................................................. A01D 45/02
[52] U.S. Cl. ...................... 56/94; 56/66; 56/98; 56/111; 56/119
[58] Field of Search ................................... 56/59, 66, 69, 56/75, 78, 82, 88, 93, 98, 111, 118, 106, 108, 94, 119

[56] References Cited

U.S. PATENT DOCUMENTS

| | | |
|---|---|---|
| Re. 31,063 | 10/1982 | Greiner et al. . |
| Re. 31,064 | 10/1982 | Shriver . |
| 1,586,069 | 5/1926 | Clark et al. . |
| 2,379,822 | 7/1945 | Mitchell et al. . |
| 2,491,195 | 12/1949 | Messenger et al. . |
| 2,527,786 | 10/1950 | Barkstrom . |
| 2,826,031 | 3/1958 | Hansen . |
| 2,961,820 | 11/1960 | Hadley . |
| 3,352,093 | 11/1967 | Procter . |
| 3,496,708 | 2/1970 | Bornzin . |
| 3,528,233 | 9/1970 | Martner et al. . |
| 3,528,234 | 9/1970 | Kowalik et al. . |
| 3,585,789 | 6/1971 | Blanshine et al. ........................... 56/98 |
| 3,670,482 | 6/1972 | Blanshine et al. . |
| 3,759,021 | 9/1973 | Schreiner et al. . |
| 3,808,783 | 5/1974 | Sutherland et al. . |
| 3,818,685 | 6/1974 | Stoessel et al. . |
| 3,854,272 | 12/1974 | Lane, III et al. . |
| 3,894,382 | 7/1975 | Jauss ........................................ 56/98 X |
| 3,940,913 | 3/1976 | Wallenfang et al. . |
| 3,982,384 | 9/1976 | Rohweder et al. . |
| 4,009,557 | 3/1977 | Reicks ........................................... 56/98 |
| 4,106,270 | 8/1978 | Weigand et al. .............................. 56/98 |
| 4,227,368 | 10/1980 | Mossman et al. . |
| 4,269,017 | 5/1981 | Debuhr et al. ............................ 56/98 X |
| 4,327,542 | 5/1982 | Van Ginhoven . |
| 4,333,304 | 6/1982 | Greiner et al. . |
| 4,493,181 | 1/1985 | Glendenning et al. . |
| 4,531,351 | 7/1985 | Sousek . |
| 4,598,535 | 7/1986 | Sousek . |
| 4,771,592 | 9/1988 | Krone et al. . |
| 4,805,388 | 2/1989 | Kell . |
| 5,060,464 | 10/1991 | Caron ........................................... 56/62 |
| 5,528,887 | 6/1996 | Nagy et al. . |

OTHER PUBLICATIONS

Allis–Chalmers Tractor Division–Milwaukee, U.S.A., "1918–1960, An Informal History", Copyright 1989 by Alan C. King.

Operators Manual, Setting Up Instructions, "McCormick 34HM–21 Corn Snapper (Two Row, Mounted Type)", International Harvester Company, No Date.

Instruction Manual and Parts List, "Snapping Unit Frame Field Improvement Parts for McCormick–Deering, No. 14P, No. 24, Corn Pickers", International Harvester Company, No Date.

(List continued on next page.)

Primary Examiner—Heather Shackelford
Attorney, Agent, or Firm—Foley & Lardner

[57] ABSTRACT

An improved row crop header for harvesting crops planted in rows. The improved row crop header has a plurality of row units mounted on a frame such that each row unit has at least one gatherer operating in a gatherer plane that is oblique to a row unit plane that passes through the structure of the row unit. The reduced projected width of the gatherer along the row unit plane reduces the width of a row unit. The adjacent gatherers of two adjacent row units overlap as they operate in offset planes. The overlap permits the row units to be arranged closer together on the frame. The closer arrangement together with the reduced width of the row units allows the row crop header to harvest narrower crop rows than the existing corn heads. A method is also provided that uses the improved row crop header to harvest narrower crop rows than in the past.

28 Claims, 4 Drawing Sheets

OTHER PUBLICATIONS

CP-8 McCormick Parts Catalog, "34HM-20 Corn Picker, 34HM-21 Corn Snapper, 34HM-22 Sweet Corn Picker (Two-Row, Mounted-Type)", International Harvester Company, No Date.

*Farm Industry News,* vol. 29, No. 11, 1996—"Does Narrow Row Corn Add Up?".

*Ontario Farmer,* vol. 29, No. 40, 1996 —"Thinking 15-Inch".

*Farm Show,* vol. 20, No. 5, 1996—"Build-It-Yourself" Narrow Row Header Kit.

1000 Series Corn Head, Operators Manual, 1995 Case Corporation.

1000 Series Corn Head, Parts Catalog, 1993 Case Corporation.

NARROW ROW CORN HEAD WITH ANGLED GATHERERS

FIELD OF THE INVENTION

This invention relates to a row crop harvesting machine. More particularly, this invention relates to a header for a row crop harvesting machine that is designed to harvest crops, such as corn, planted in rows spaced closer together than in the past.

BACKGROUND OF THE INVENTION

Several variations of header units have been used in combines or harvesting machines for harvesting row crops such as corn and cotton. One of the first such header units was a corn head with fixed spacing between the row units. Several other corn heads allowing variable spacing between the row units were then developed.

With the advent of the variable row width header units, the last several years has seen a rapid increase in the research and development of the effect of varying row widths on the growth of corn and other row crops. The existing corn heads and harvesting machines are designed to efficiently harvest corn planted in rows having a row width of greater than 20 inches, because the existing corn heads have the gatherers of their row units in the same plane, thereby limiting how close the row units can be arranged together.

For example, a typical existing corn head with a plurality of row units has both the gatherers of each row unit positioned in the same plane. Thus, the adjacent gatherers of any two adjacent row units are also positioned in the same plane. This effectively limits how close the adjacent row units can be positioned as the adjacent gatherers of the adjacent row units can interfere with each other if the adjacent row units are positioned too close to each other.

Likewise, the technology to build the row unit components, such as the gatherers, limits the minimum size of a row unit. Thus, the positioning of the row unit components effectively limits the minimum width of a row unit. Therefore, the minimum row unit width together with the positioning of adjacent row units determines the minimum crop row width that can be efficiently harvested by the existing corn heads. Thus, current technology limits the row widths to about 20 inches because the gatherers in adjacent row units of the existing corn heads can interfere with each other if they are positioned any closer.

Recent research on the spacing of the corn rows has indicated special benefits for narrower row spacings that are 12–16 inches apart. In addition to the obvious increase in yield and crop population, these benefits include improved erosion control and better weed control. The narrower rows also require less chemicals and pesticides per unit of yield thereby benefitting the environment.

Existing header units are not designed to harvest rows having a spacing of 16 inches or less. Consequently, they are very wasteful and inefficient in harvesting narrow rows leading to a sub-optimal harvesting efficiency.

The problems identified above are not intended to be exhaustive but are among the many that reduce the effectiveness of current solutions to the problem of harvesting crops planted in narrow rows. Other problems may also exist; however, those presented above should be sufficient to demonstrate that currently known solutions are amenable to worthwhile improvement.

SUMMARY OF THE INVENTION

Accordingly, it would be desirable to provide a row crop header that alleviates the problem of harvest efficiency of narrow crop row widths by allowing efficient harvesting of narrower crop rows.

It would also be desirable to provide a row crop header having reduced width row units spaced closer together to harvest narrower rows and thereby reduce the use of fertilizers and pesticides and benefit the environment.

It would also be further desirable to provide a method of harvesting row crops using an improved row crop header that allows the harvesting of crops planted in narrower rows than currently practicable.

The present invention provides a row crop header with at least one row unit mounted on a frame of the row crop header. The row unit includes a row unit plane and at least one gatherer operating in a gatherer plane that is oblique to the row unit plane. The oblique gatherer plane reduces the minimum width of the row unit measured along the row unit plane because the projected width of the gatherer on the row unit plane is less than the actual width of the gatherer along the gatherer plane.

The row crop header further includes a first row unit having a primary gatherer operating in a first gatherer plane, and an adjacent second row unit having a secondary gatherer operating in a second gatherer plane. The first gatherer plane and the second gatherer plane are offset. This configuration allows the two adjacent row units to be arranged closer together because the adjacent gatherers overlap along an axis that is substantially parallel to both the first gatherer plane and the second gatherer plane. Increasing the overlap reduces the distance between the adjacent row units. The overlap together with the reduced width of the row units, discussed above, further reduces the minimum crop row width harvested by the row crop header.

The present invention also defines a method that provides a row crop header including a first row unit having a row unit plane and at least one gatherer operating in a first gatherer plane, and an adjacent second row unit positioned in the row unit plane and having at least one gatherer operating in a second gatherer plane. The first gatherer plane and the second gatherer plane are offset. Both the first gatherer plane and the second gatherer plane are oblique to the row unit plane.

The first row unit and second row unit are connected to the frame of the row crop header with a primary gatherer of the first row unit overlapping a secondary gatherer of the second row unit along an axis that is substantially parallel to both the first gatherer plane and the second gatherer plane. The overlap together with the oblique gatherer planes permits the row crop header of the present invention to efficiently harvest narrower crop rows when the row crop header is mounted on a harvesting machine.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DETAILED DESCRIPTION OF THE PREFERRED EMBODIMENTS

Figure 1:
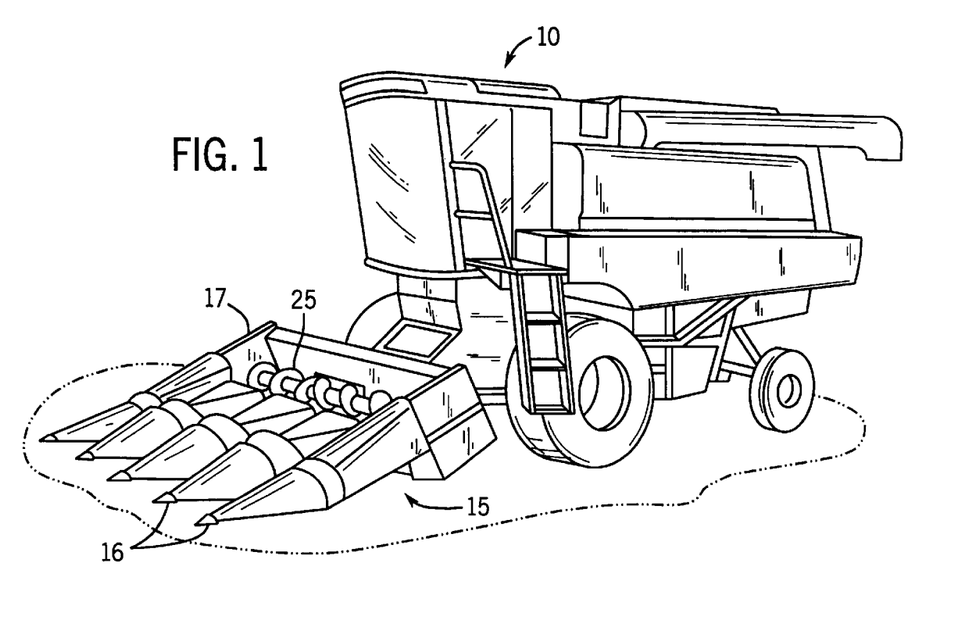
FIG. 1 is a perspective view of a harvesting machine with an attached row crop header provided by the invention.

FIG. 1 shows an improved row crop header, indicated generally as 15, connected to a combine or harvesting machine 10. The improved row crop header 15 has a unique configuration that permits the efficient harvesting of the crops planted in rows spaced closer together than in the past.

Figure 2:
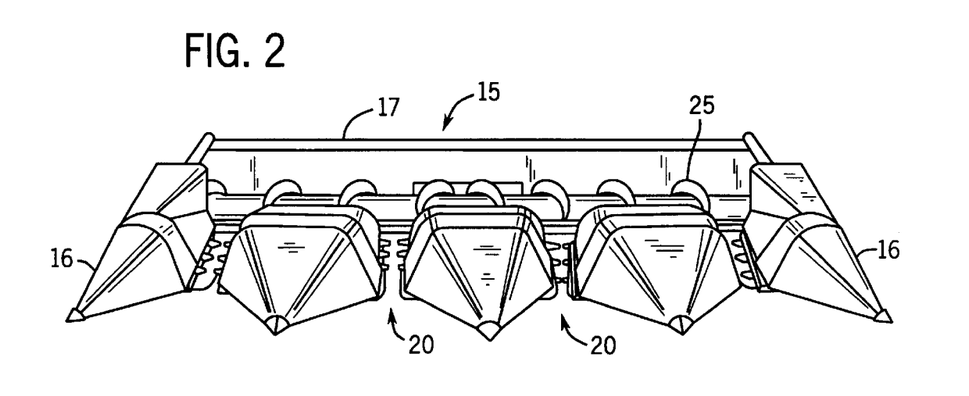
FIG. 2 is a perspective front view of the row crop header shown in FIG. 1.

FIG. 2 shows the row crop header 15 having a plurality of row units 20 connected to a frame 17 of the row crop header 15. The row units 20 are covered by a plurality of housings 16. Note that in the figures, like numerals indicate like parts.

Figure 3:
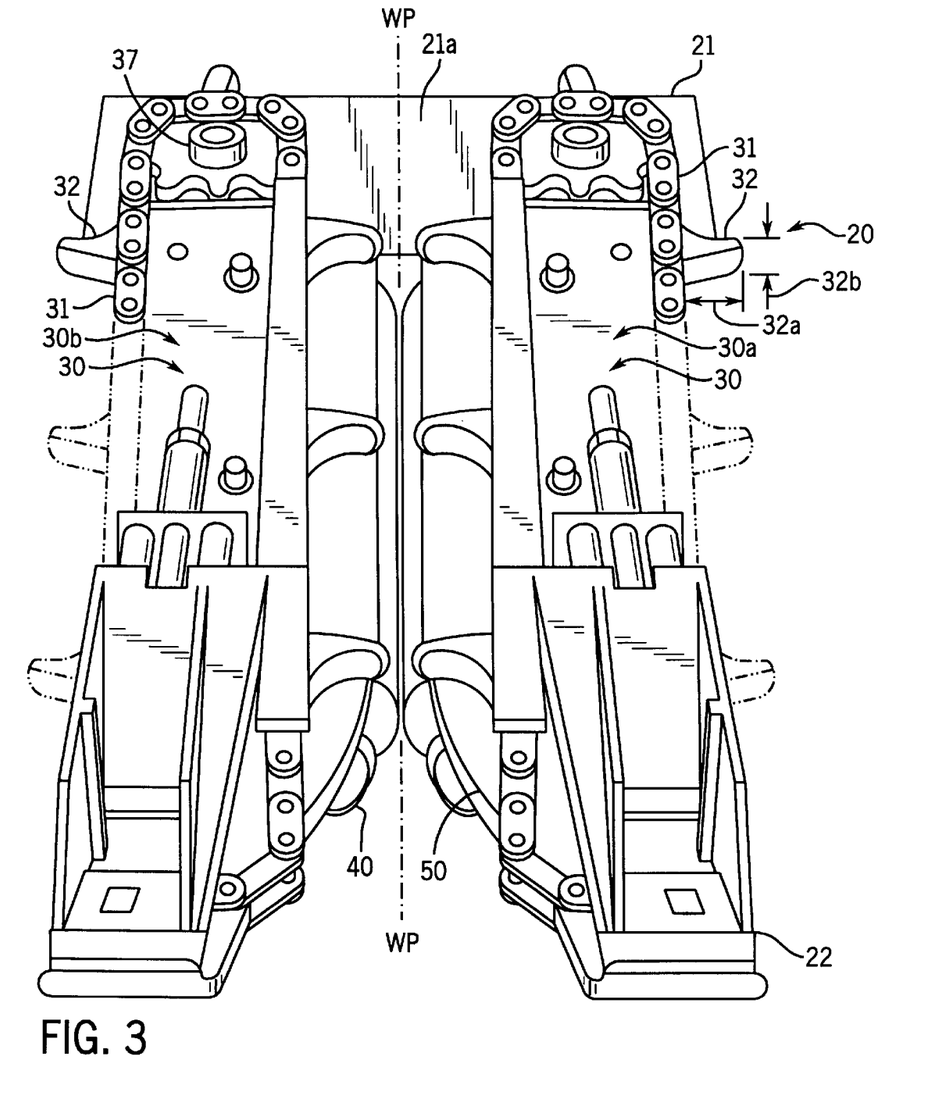
FIG. 3 is a perspective view of a row unit of the row crop header shown in FIGS. 1 and 2.

As shown in FIG. 3, each row unit 20 has a frame end 21 and a head end 22. The frame end 21 of the row unit 20 attaches to the frame 17, while the head end 22 serves as the longitudinal extension of the row unit 20 and as a crop engagement device. That is, the row unit 20 extends forward from the frame end 21 to the head end 22 such that a crop stalk is engaged proximate the head end 22 and is discharged proximate the frame end 21. The frame end 21 also has a backing plate 21a which is located within the structure of the row unit 20.

Each row unit 20 also has least one gatherer 30. The preferred embodiment of the row unit 20 has two gatherers, a primary gatherer 30a and a secondary gatherer 30b. Also in the preferred embodiment, each gatherer 30 includes a gathering chain 31 driven by at least one sprocket 37. The gathering chain 31 has a plurality of protruding members extending outward from the gathering chain 31. In the preferred embodiment, the protruding members comprise protruding fingers 32 having at least one surface adapted to contact and move corn ears or other harvested crop. The gathering chain 31 traverses a substantially oval path and extends forward from proximate the frame end 21 to proximate the head end 22 of the row unit 20.

Alternative embodiments of the gatherer 30 are also possible. For example, instead of a gathering chain 31, a belt or a rope with protruding members or other similar devices adapted to move corn ears may also be used.

As shown in FIG. 3, the row unit 20 has a work plane WP—WP that passes between the primary gatherer 30a and the secondary gatherer 30b. In the preferred embodiment, the work plane WP—WP substantially passes through a row of corn stalks (not shown in figure) as they are pulled in by a pair of stalk rolls 40 that are supported by the row unit 20. Thus, during operation of the row crop header 15, the work plane WP—WP is substantially perpendicular to the ground surface from which the corn stalks are harvested.

The pair of stalk rolls 40 pull the corn stalks so that the corn ears are removed from the stalks when the stalks come into contact with a pair of stripper plates 50 that are positioned within the row unit 20. The stripper plates 50 can be spatially adjusted to optimize the effectiveness of the stripper plates 50 in cooperating with the stalk rolls 40 to remove corn ears from the stalks and increase harvesting efficiency.

After removal of the corn ears from the corn stalks by the stripper plates 50, the removed corn ears are then carried backwards by the fingers 32 of gathering chain 31 to a conveying mechanism, such as a cross auger 25, shown in FIGS. 1 & 2. The auger 25 moves the corn ears to a grain housing or collection device (not shown) of the harvesting machine 10 on which the row crop header 15 is mounted.

Figure 4:
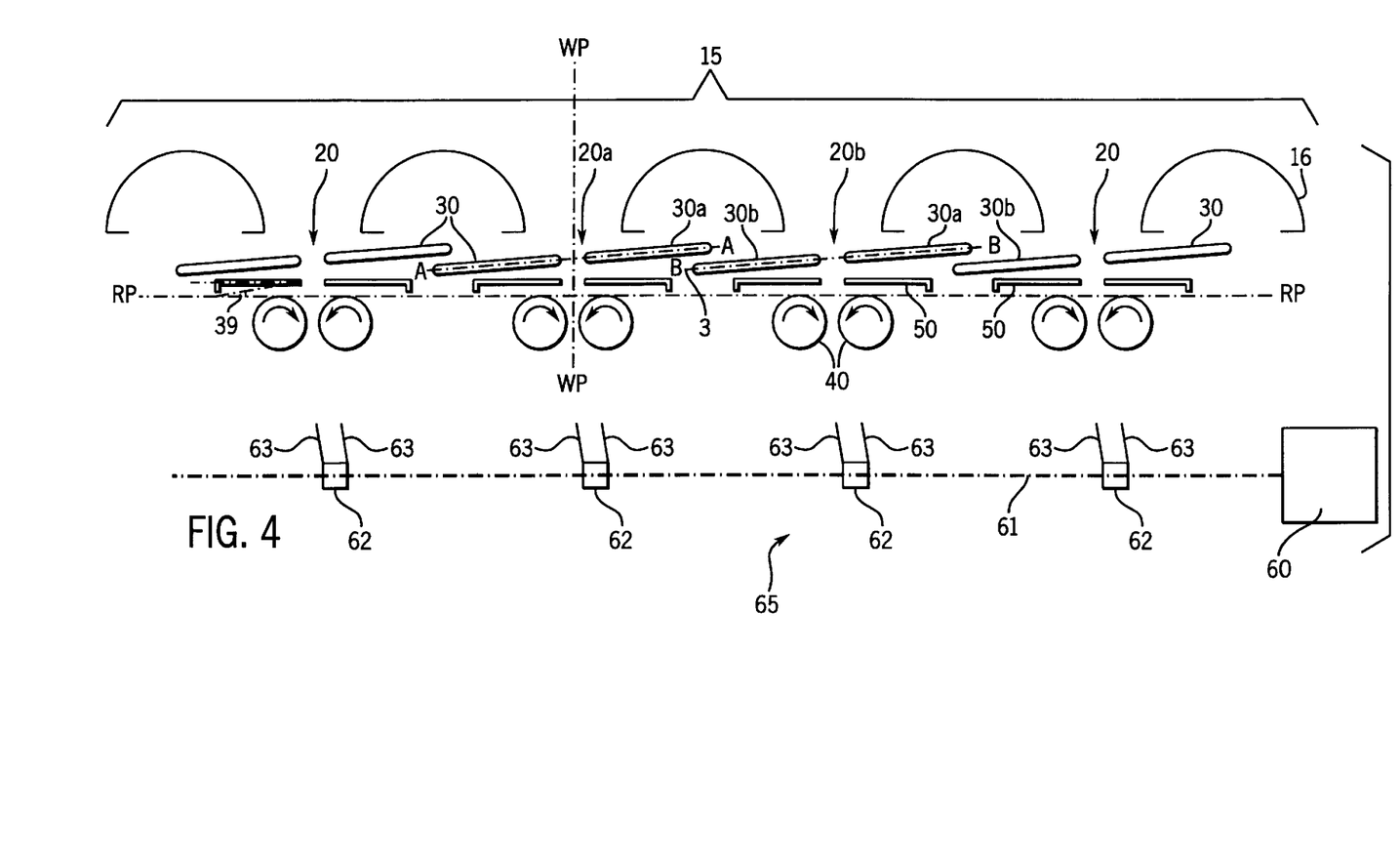
FIG. 4 is a schematic front view of the row crop header showing a plurality of row units with the gatherers of adjacent row units positioned in offset gatherer planes.
Figure 5:
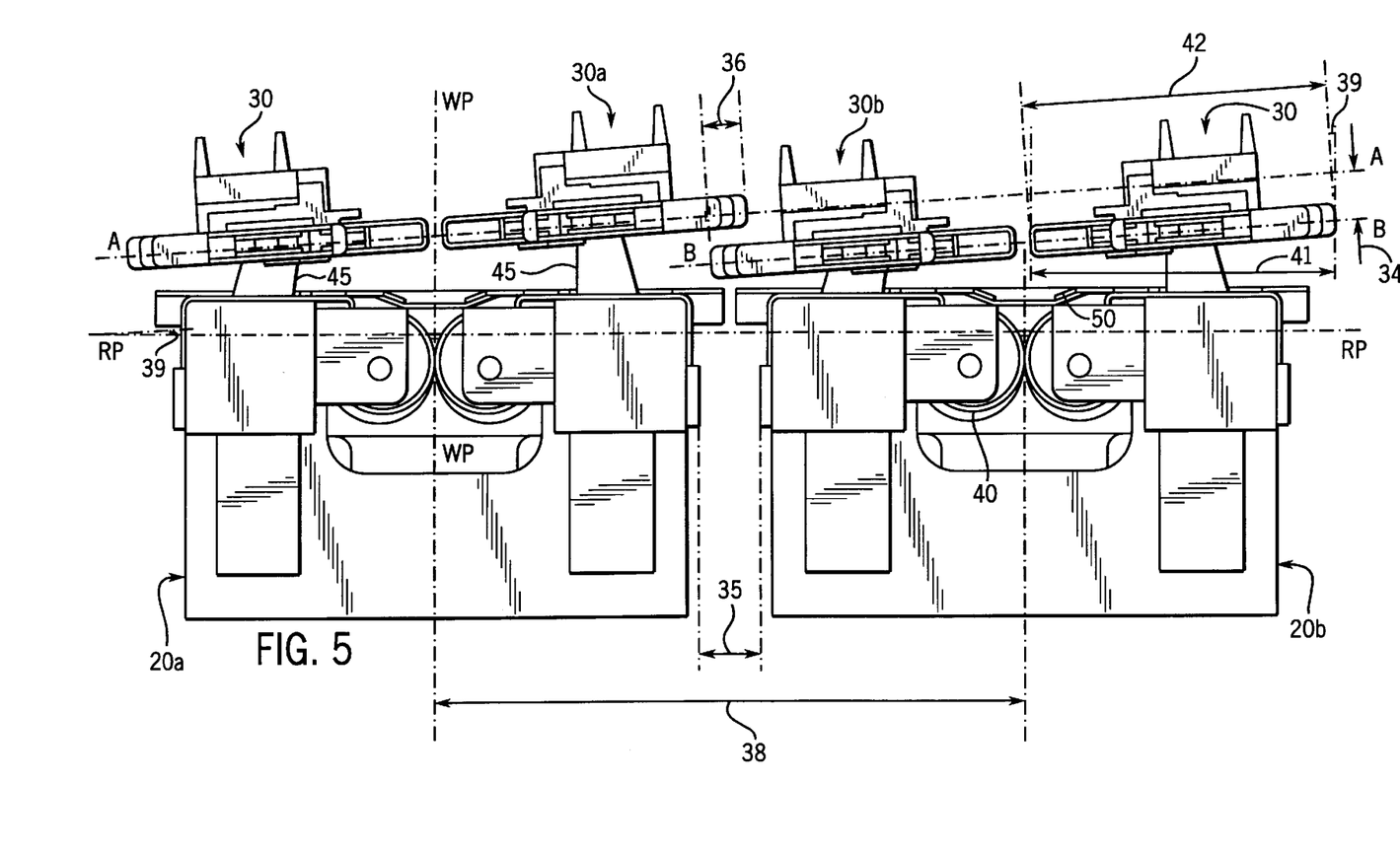
FIG. 5 is a detailed front view of two adjacent row units of the row crop header shown in FIGS. 1, 2, and 4.

FIGS. 4 & 5 show the unique configuration of the row units 20 of the improved row crop header 15. FIG. 4 is a schematic front view of a plurality of row units 20 of the preferred embodiment of the row crop header 15. Each of the plurality of row units 20 is connected to the frame of the row crop header 15. The row crop header 15 is provided with a housing 16 that covers the adjacent gatherers 30 of two adjacent row units 30. The housing 16 also serves as guides for the rows of corn stalks as the row crop header is moved forward by the harvesting machine 10, shown in FIG. 1.

Each row unit 20 includes a row unit plane RP—RP, shown in FIG. 4, that passes through the support structure of the row unit 20. In the preferred embodiment, the row unit plane RP—RP is defined as passing through the backing plate 21a, shown in FIG. 3, which is a part of the support structure of the row unit 20. However, alternate definitions of the row unit plane RP—RP can also be determined with respect to other row unit components such as the stalk rolls 40 or the stripper plates 50. The row unit plane RP—RP is preferably substantially perpendicular to the work plane WP—WP that substantially passes through the crop rows harvested during the operation of the row crop header 15.

Each row unit 20 also includes at least one gatherer 30 that operates in a gatherer plane. In the preferred embodiment, row unit 20a has two gatherers 30 operating in a first gatherer plane A—A and row unit 20b has two gatherers 30 operating in a second gatherer plane B—B. The gatherer planes A—A and B—B are each oblique to both the row unit plane RP—RP and the work plane WP—WP.

The oblique positioning of the gatherer planes A—A and B—B reduces the projected width of the row units 20 measured along the row unit plane RP—RP. As shown in FIG. 5, the projected width 41 of the gatherer 30 measured along the row unit plane RP—RP is less than the actual width 42 of the gatherer 30 measured along the gatherer planes A—A or B—B. Therefore, increasing the oblique angle 39 between the gatherer planes A—A, B—B and the row unit plane RP—RP further reduces the projected width 41 of the row unit 20 measured along the row unit plane RP—RP. In the preferred embodiment, the oblique angle 39 is approximately between 4 degrees and 10 degrees.

Each row unit 20 of the row crop header 15 is also positioned so that its gatherers 30 operate in an offset plane from the gatherers 30 of the adjacent row units 20. Thus, as shown in FIG. 5, the first row unit 20a has both its primary gatherer 30a and its secondary gatherer 30b operating in the first gatherer plane A—A. Likewise, the second row unit 20b, adjacent to the first row unit 20a, has both its primary gatherer 30a and a secondary gatherer 30b operating in the second gatherer plane B—B. The second gatherer plane B—B is offset 34 from the first gatherer plane A—A. The offset 34 measures the separation of the first gatherer plane A—A and the second gatherer plane B—B.

In the preferred embodiment of the row crop header 15, the offset 34 always has a positive value as the two gatherer planes A—A and B—B are distinct and do not coincide. Also, in the preferred embodiment, the two gatherer planes A—A and B—B are substantially parallel to each other and the offset 34 is measured along an axis that is perpendicular to both the first gatherer plane A—A and the second gatherer plane B—B.

It is to be understood that "adjacent" row units refer to two row units 20, such as row unit 20a and row unit 20b, that are placed next to each other along the frame although structural members or other elements could be interposed between the two adjacent row units 20. Thus, row unit 20a is adjacent to row unit 20b as long as no other row unit 20 is positioned between them even though other structural members or elements may be interposed between them. Likewise, "adjacent" gatherers refer to gatherers 30, for example, gatherers 30a and 30b of the separate row units 20a and 20b, that are placed next to each other although other structural members may be interposed between them.

In the preferred embodiment of the row crop header 15, the gatherers 30 of the adjacent row units 20a, 20b are positioned in the first gatherer plane A—A and the second gatherer plane B—B, respectively. As shown in FIG. 4 this arrangement is accomplished by the row units 20 themselves being positioned in a same plane. For example, both the row units 20a and 20b could be positioned on the row unit plane RP—RP. The gatherers 30 of the first row unit 20a are, however, offset from the gatherers 30 of the second row unit 20b as they are positioned in the offset planes A—A and B—B, respectively.

The offset 34 between the two gatherer planes A—A, B—B, in a preferred embodiment, is adjustable to optimize the effectiveness of the gatherers 30 in moving the harvested crop backward to the cross auger 25 and thereon to the grain collection device. Such an adjustment mechanism could be provided by, for example, a supporting bracket 45 for both the gatherers 30 of a row unit 20. The supporting bracket would have a plurality of slots (not shown) so that the gatherers 30 could be positioned in any of the slots to adjust the offset 34.

As shown in FIG. 5, two adjacent row units, the first row unit 20a and the second row unit 20b, are arranged closer together than in the existing corn heads because the primary gatherer 30a of the first row unit 20a operates in offset planes, A—A and B—B, from the adjacent secondary gatherer 30b of the adjacent second row unit 20b. This permits the adjacent gatherers 30a, 30b to overlap 36 along an imaginary axis that is substantially parallel to both the first gatherer plane A—A and the second gatherer plane B—B.

The fingers 32 of the adjacent gatherers 30a, 30b of adjacent row units 20a, 20b overlap as the gatherer 30a of row unit 20a is offset 34 from the adjacent gatherer 30b of row unit 20b. The overlap 36 permits the distance 35 between two adjacent row units 20a, 20b to be reduced by an amount that is proportional to the overlap 36. Thus, the overlap 36 allows a closer arrangement of the row units 20 along the frame 17 of the row crop header 15. This closer arrangement of the row units 20, together with the decreased width of the row units 20 due to the oblique gatherer planes A—A and B—B, further reduces the harvesting width 38 to less than the minimum crop row width achievable in the existing corn heads.

In the preferred embodiment of the row crop header 15, the overlap 36 is approximately between 5 inches and 6 inches to achieve a reduction of the harvesting width 38 to less than 16 inches. In the preferred embodiment, the offset 34 is approximately 1.5 inches which allows the two adjacent gatherers 30a, 30b to overlap 36 sufficiently to reduce the harvesting width 38 of the row crop header 15. The offset 34 should also preferably be greater than the finger height 32b to ensure that the fingers of adjacent gatherers, such as 30a and 30b, clear or do not interfere with each other during the operation of the row crop header 15.

The driven row unit 20 components, such as the gatherers 30 and the stalk rolls 40, are driven by a drive mechanism 65, shown schematically in FIG. 4. The drive mechanism 65 includes a power source 60 connected to a drive shaft 61 with a plurality of gear boxes 62 adapted so that the power outputs from the gear boxes 62 drive the gatherers 30 and the stalk rolls 40.

In the preferred embodiment, shown in FIG. 4, the gear box 62 has worm gears that transmit power from the drive shaft 61 to the gatherer shafts 63. The gatherer shafts 63 are oblique to the drive shaft 61 and directly drive the gatherer sprockets 37.

In an alternative embodiment, the gear box 62 has bevel gears that transmit power from the drive shaft 61 to a substantially perpendicular intermediate shaft (not shown). The intermediate shaft drives the oblique gatherer shaft 63 with an extra set of bevel gears. The gatherer shafts 63 drive the gatherers sprockets 37.

In another alternative embodiment, an oblique intermediate shaft (not shown) is driven by the drive shaft 61 by using bevel or worm gears. An extra set of spur gears can be used to transmit power from the intermediate shaft to the gatherer shaft 63 that is parallel to the intermediate shaft.

Although shown schematically in FIG. 4 as being separate for the purposes of clarity, it is to be understood that the drive mechanism 65, described above, is suitably installed within the row crop header 15 and connected to the driven row unit components.

The drive mechanism 65 and gearing systems used are described in several U.S. Patents and textbooks and any of them could be easily adapted for use with the row crop header 15. For example, spur, worm, and bevel gearing are described in the textbook by Hamilton H. Mabie and Charles L. Reinholtz, *Mechanisms and Dynamics of Machinery,* John Wiley and Sons, Inc., pages 128–235, the disclosure of which is incorporated herein in its entirety, by reference.

Referring to FIGS. 4 & 5, an improved method is also provided which includes providing a row crop header 15 with two adjacent row units 20 such that a first row unit 20a has a row unit plane RP—RP and at least one gatherer 30 operating in a first gatherer plane A—A and a second row unit 20b positioned in the row unit plane RP—RP and at least one gatherer 30 operating in a second gatherer plane B—B. The first gatherer plane A—A and the second gatherer plane B—B are substantially parallel to each other and spaced apart by an offset 34. Both the first gatherer plane A—A and the second gatherer plane B—B are oblique to the row unit plane RP—RP and the first row unit 20a and the second row unit 20b are connected to a frame of the row crop header.

The method also provides that a primary gatherer 30a of the first row unit 20a overlaps a secondary gatherer 30b of the second row along an axis that is substantially parallel to both the first gathering plane A—A and the second gathering plane B—B. The row crop header 15 is connected to a harvesting machine 10, as shown in FIG. 1, and then operated using a power source 60 to harvest row crops planted in narrower rows than in the past. The preferred embodiment of the row crop header 15 operates on rows of corn, however, the instant row crop header could be easily adapted to work with other row crops, such as cotton and sunflower.

The improved row crop header 15 permits a closer arrangement of the row units 20 to harvest crop rows that are 16 inches apart or less. Existing corn heads with the row units in substantially the same plane are unable to efficiently harvest rows that are narrower than 20 inches. Therefore, some of the major advantages of the instant row crop header include the unique combination of providing an improved apparatus and method that:

(i) permits the harvesting of narrower crop rows by allowing the row units to be arranged closer together on the row crop header frame;

(ii) benefits the environment by reducing the requirement for chemicals and pesticides per unit of crop harvested; and (iii) improves soil control and erosion by allowing crop rows to be planted closer together.

Other embodiments of the row crop header will be apparent to those skilled in the art from consideration of the specification disclosed herein. It is intended that the specification be considered as exemplary only, with the true scope and spirit of the invention being indicated by the following claims.

What is claimed is:

1. A row unit having a frame end and a head end, the row unit comprising:
   a frame;
   at least one crop separating edge supported in a row unit plane by the frame, wherein the crop separating edge is configured to separate crop portions to be harvested from remaining crop portions; and
   at least one gatherer supported by the frame to operate in a gatherer plane oblique to the row unit plane, wherein the gatherer plane intersects the row unit plane along an axis extending from the frame end to the head end.

2. A row crop header for a harvesting machine for harvesting a crop growing in ground having a surface, the header comprising:
   a frame;
   at least one crop separating edge supported in a row unit plane by the frame, wherein the crop separating edge is configured to separate crop portions to be harvested from remaining crop portions; and
   a first row unit mounted on said frame, the first row unit having a frame end and a head end and including a first gatherer operating in a first gatherer plane, the first gatherer including a plurality of fingers having a finger height and a finger width; and
   a second row unit adjacent to said first row unit and having second gatherer operating in a second gatherer plane, wherein said first gatherer plane and said second gatherer plane are vertically offset by a distance greater than the finger height and wherein the first gatherer operates in the first gatherer plane oblique to the row unit plane and intersecting the row unit plane along an axis extending from the head end to the frame end.

3. The row crop header according to claim 2, including at least one crop guiding surface along the fist and second row units to provide the first and second row units with first and second crop receiving passages, respectively, wherein the first and second crop receiving passages extend parallel to one another from the head end to the frame end.

4. The row crop header according to claim 2 wherein said offset is approximately 1.5 inches.

5. The row crop header according to claim 2 wherein said first gatherer plane is substantially parallel to said second gatherer plane.

6. The row crop header according to claim 2 wherein the first and second gatherers overlap one another between the first and second row units at the head end.

7. The row crop header according to claim 2 wherein the gatherers include continuous chains supported by sprocket wheels to traverse a generally oval path.

8. The row crop header according to claim 2 wherein the row crop header has a rear end configured for being coupled to the harvesting machine and a front end opposite the rear end and wherein the first gatherer and the second gatherer overlap one another at the front end.

9. The row crop header according to claim 8 wherein the first and second gatherers have a length extending from the front end towards the rear end and wherein the first and second gatherers overlap one another along the entire length.

10. The row crop header according to claim 2 wherein the first gather and the second gather overlap.

11. The row crop header according to claim 10 wherein said overlap is approximately between 4 inches and 5 inches.

12. The row crop header according to claim 2 further comprising a drive mechanism including a gear box wherein a power output from said gear box drives the first gatherer.

13. The row crop header according to claim 2 wherein each of the gatherers each include a chain operatively connected to said plurality of fingers so that said plurality of fingers extend outward from said chain.

14. The row crop header according to claim 2 wherein said chain is supported by a pair of sprockets to traverse a substantially oval path.

15. The row crop header according to claim 2 wherein the first row unit further comprises:
   a plurality of stalk rolls supported by the frame; and
   a plurality of stripper plates supported by the frame proximate said plurality of stalk rolls to remove corn ears from corn stalks.

16. The row crop header according to claim 15 wherein said plurality of stripper plates comprises two adjustable spaced stripper plates.

17. The row unit according to claim 1 including:
   at least one stripper plate supported by the frame proximate said at least one gatherer, wherein said at least one stripper plate provides said at least one crop separating edge; and
   at least one stalk roll supported by the frame proximate said at least one stripper plate, wherein said at least one stalk roll and said at least one stripper plate cooperate to remove corn ears from corn stalks.

18. A row crop header having a rear end configured for being coupled to a harvesting machine and a front end opposite the rear end, the row crop header comprising:
   a frame;
   at least one crop separating edge supported in a row unit plane by the frame, wherein the crop separating edge is configured to separate crop portions to be harvested from remaining crop portions; and
   a plurality of row units having a frame end and a head end, the plurality of row units including:
   a first row unit having a first gatherer supported by the frame and extending between the frame end and the head end towards the; and
   a second row unit having a second gatherer supported by the frame and extending between the frame end and the head end, wherein the first and second gatherers overlap one another at the frame end of the header and wherein the first and second gatherers operate in first and second gatherer planes, respectively, extending oblique to the row unit plane, the first and second gatherer planes intersecting the row unit plane along an axis extending from the head end to the frame end.

19. The row crop header of claim 18 wherein the first and second gatherers have a length extending from the head end to the frame end and wherein the first and second gatherers overlap one another along the entire length.

20. The row crop header of claim 18, including at least one crop guiding surface along the first and second row units to provide the first and second row units with first and second crop receiving passages, respectively, wherein the first and second crop receiving passages extend parallel to one another from the head end to the frame end.

21. The row crop header of claim 18 wherein the first row unit includes:
   at least one stripper plate supported by the frame proximate the first gatherer to provide said at least one crop separating edge; and
   at least one stalk roll supported by the frame proximate said at least one stripper plate, wherein said at least one stalk roll and said at least one stripper plate cooperate to remove corn ears from corn stalks.

22. The row crop header of claim 18 wherein the first and second gatherers operate in first and second gatherer planes, respectively, which are vertically offset from one another.

23. The row crop header of claim 22 wherein the first gatherer includes a plurality of fingers having a finger height and a finger width, wherein the first and second gatherers operate in first and second gatherer planes, respectively, which are vertically offset from one another by a distance greater than the finger height.

24. The row crop header of claim 18, wherein the first and second gatherers overlap between the first and second row units.

25. The row crop header of claim 18, wherein the first row unit includes a third gatherer extending in a third gatherer plane oblique to the row unit plane.

26. The row crop header of claim 25, wherein the first and second gatherer planes are co-extensive.

27. A row crop header having a rear end configured for being coupled to a harvesting machine and a front end opposite the rear end, the row crop header comprising:
   a frame;
   at least one crop separating edge supported in a row unit plane by the frame, wherein the crop separating edge is configured to separate crop portions to be harvested from remaining crop portions; and
   a plurality of row units having a frame end and a head end, the plurality of row units including:
      a first row unit having a first gatherer supported by the frame and extending from the head end to the frame end; and
      a second row unit having a second gatherer supported by the frame and extending from the head end to the frame end, wherein the first row unit and the second row unit include crop guiding surfaces which provide the first and second row units with first and second crop receiving passages parallel to one another from the front end towards the rear end and, wherein the first and second gatherers extend between the first and second crop receiving passages, wherein the first and second gatherers operate in first and second gatherer planes, respectively, which extend oblique to the row unit plane and which are vertically offset from one another, wherein each gatherer plane intersects the row unit plane along at least one axis extending from the head end to the frame end.

28. A row crop header having a rear end configured for being coupled to a harvesting machine and a front end opposite the rear end, the row crop header comprising:
   a frame;
   at least one crop separating edge supported in a row unit plane by the frame, wherein the crop separating edge is configured to separate crop portions to be harvested from remaining crop portions; and
   a plurality of row units supported by the frame and having a frame end and a head end, the plurality of row units including:
      a first row unit including:
         a first gatherer supported by the frame and extending from the head end to the frame end;
         at least one stripper plate supported by the frame proximate the first gatherer; and
         at least one stalk roll supported by the frame proximate the first gatherer, wherein said at least one stripper plate and said at least one stalk roll cooperate to remove corn ears from corn stalks; and
      a second row unit having a second gatherer supported by the frame adjacent the first gatherer and extending from the head end to the frame end, wherein the first and second gatherers operate in first and second gatherer planes, respectively, which extend oblique to the row unit plane and which are vertically offset from one another, wherein the first and second gatherers overlap one another at the head end, and wherein each gatherer plane intersects the row unit plane along at least one axis extending from the head end to the frame end.

* * * * *